C. L. FAWCETT.
BEARING SCRAPER.
APPLICATION FILED JULY 10, 1912.
1,065,230.
Patented June 17, 1913.
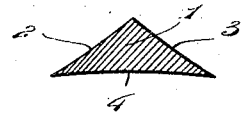
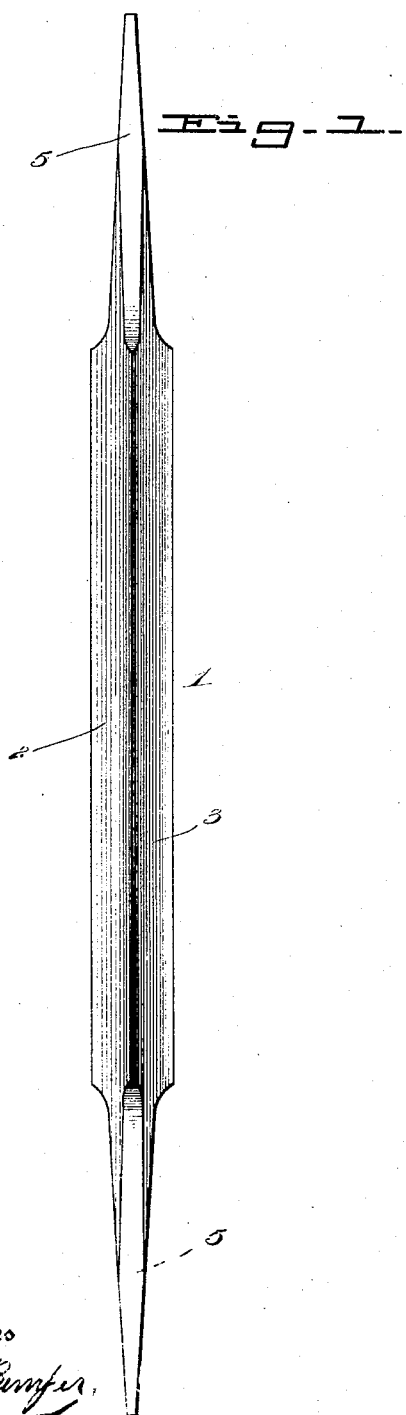
Witnesses
C.E. Pumfer,
P.M. Smith.
Inventor
Charles L. Fawcett.
By Victor J. Evans
Attorney

UNITED STATES PATENT OFFICE.

CHARLES L. FAWCETT, OF SMITH CENTER, KANSAS.

BEARING-SCRAPER.

1,065,230.  Specification of Letters Patent.  Patented June 17, 1913.

Application filed July 10, 1912. Serial No. 708,664.

*To all whom it may concern:*

Be it known that I, CHARLES L. FAWCETT, a citizen of the United States, residing at Smith Center, in the county of Smith and State of Kansas, have invented new and useful Improvements in Bearing-Scrapers, of which the following is a specification.

This invention relates to bearing scrapers, being especially designed for scraping and truing up the bearings now in common use in motors of all descriptions.

A further object of the invention is to provide a scraper having a plurality of hollow ground surfaces and parallel cutting edges, the hollow ground surfaces being of different widths, so as to adapt the implement as a whole to bearings of different diameters.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a plan view of a bearing scraper embodying the present invention. Fig. 2 is a cross section through the same.

The body 1 of the scraper, in the preferred embodiment of this invention, is triangular in cross section, or in other words, comprises three faces, 2, 3, and 4, respectively, the same being of different widths.

The scraper may be made of any desired length, and is provided at its opposite ends with the longitudinally projecting shanks 5 adapted to receive suitable handles.

Each of the three faces of the body of the scraper is hollow ground or concaved in cross section, as clearly shown, to facilitate sharpening the cutting edges which lie on opposite sides of the hollow ground faces.

It will be understood that in the formation of the bearing scraper in the manner illustrated in the drawings and hereinabove described, a plurality of hollow ground or concaved scraping faces are provided, and each of said faces, irrespective of the width thereof, is bounded or defined by parallel cutting edges. On account of the faces of the body of the scraper being of different widths and arcs, the tool as a whole is admirably adapted to bearings of different sizes and will be found particularly useful and desirable in scraping bearings now in common use in internal combustion motors, such as are used on automobiles, motor boats, and the like.

What is claimed is:

A bearing scraper having the form of an isosceles triangle in cross section and having the three faces thereof of different widths, each hollow ground and bounded at opposite sides by parallel cutting edges, and shanks extending longitudinally beyond the opposite extremities of the body.

In testimony whereof I affix my signature in presence of two witnesses.

CHARLES L. FAWCETT.

Witnesses:
H. W. MACKEY,
GEORGE E. HOMMON.

---

Copies of this patent may be obtained for five cents each, by addressing the "Commissioner of Patents, Washington, D. C."